No. 11,690. Reissued Aug. 30, 1898.

J. P. LAVIGNE.

TURRET LATHE.

(Application filed Aug. 3, 1898.)

7 Sheets—Sheet I.

Witnesses.
J. H. Shumway
Lillian D. Kelsey

Joseph P. Lavigne
Inventor.
By atty. Earle Seymour

No. 11,690. Reissued Aug. 30, 1898.

J. P. LAVIGNE.

TURRET LATHE.

(Application filed Aug. 3, 1898.)

7 Sheets—Sheet 2.

Witnesses:
J. H. Shumway.
Lillian D. Kelsey.

Joseph P. Lavigne,
Inventor.
By atty. Earle Seymour

No. 11,690. Reissued Aug. 30, 1898.

J. P. LAVIGNE.

TURRET LATHE.

(Application filed Aug. 3, 1898.)

7 Sheets—Sheet 3.

Witnesses.
J. H. Shumway.
Lillian D. Kelley.

Joseph P. Lavigne,
Inventor.
By atty's Earle Seymour

No. 11,690. Reissued Aug. 30, 1898.
J. P. LAVIGNE.
TURRET LATHE.
(Application filed Aug. 3, 1898.)
7 Sheets—Sheet 4.
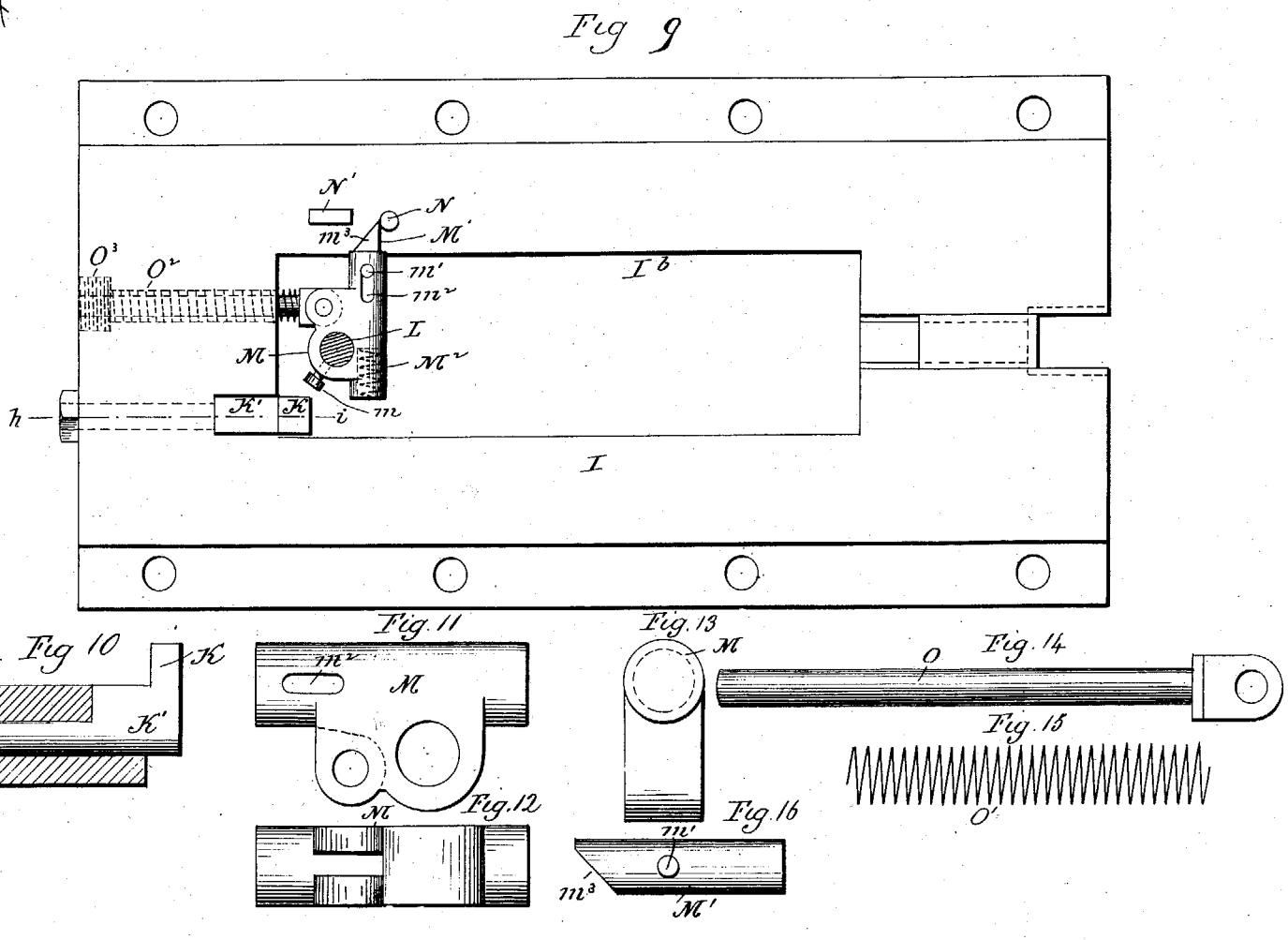
Witnesses,
J. H. Shumway
Lillian D. Kelley
Joseph P. Lavigne
Inventor
By Atty's Earle Seymour No. 11,690. Reissued Aug. 30, 1898.
J. P. LAVIGNE.
TURRET LATHE.
(Application filed Aug. 3, 1898.)
7 Sheets—Sheet 5.
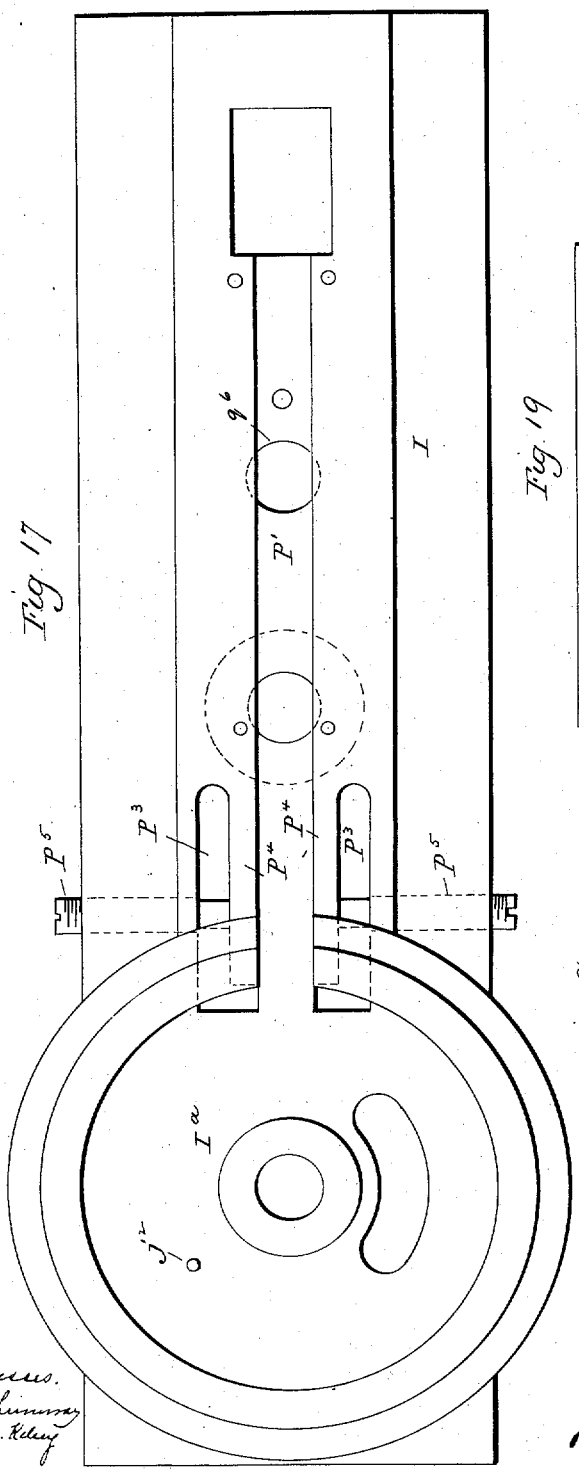
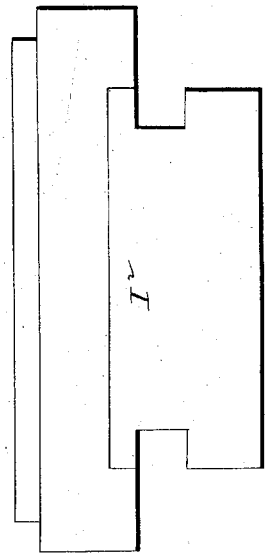
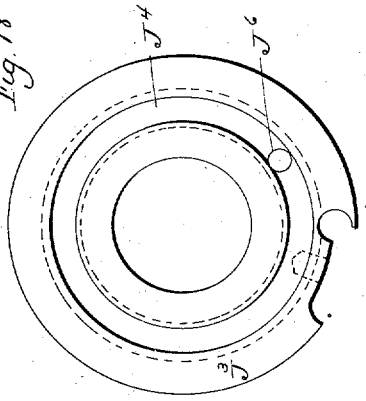
Witnesses.
J. H. Shumway
Lillian D. Kelley
Joseph P. Lavigne
Inventor
By atty Earle & Seymour No. 11,690. Reissued Aug. 30, 1898.
J. P. LAVIGNE.
TURRET LATHE.
(Application filed Aug. 3, 1898.)
7 Sheets—Sheet 6.
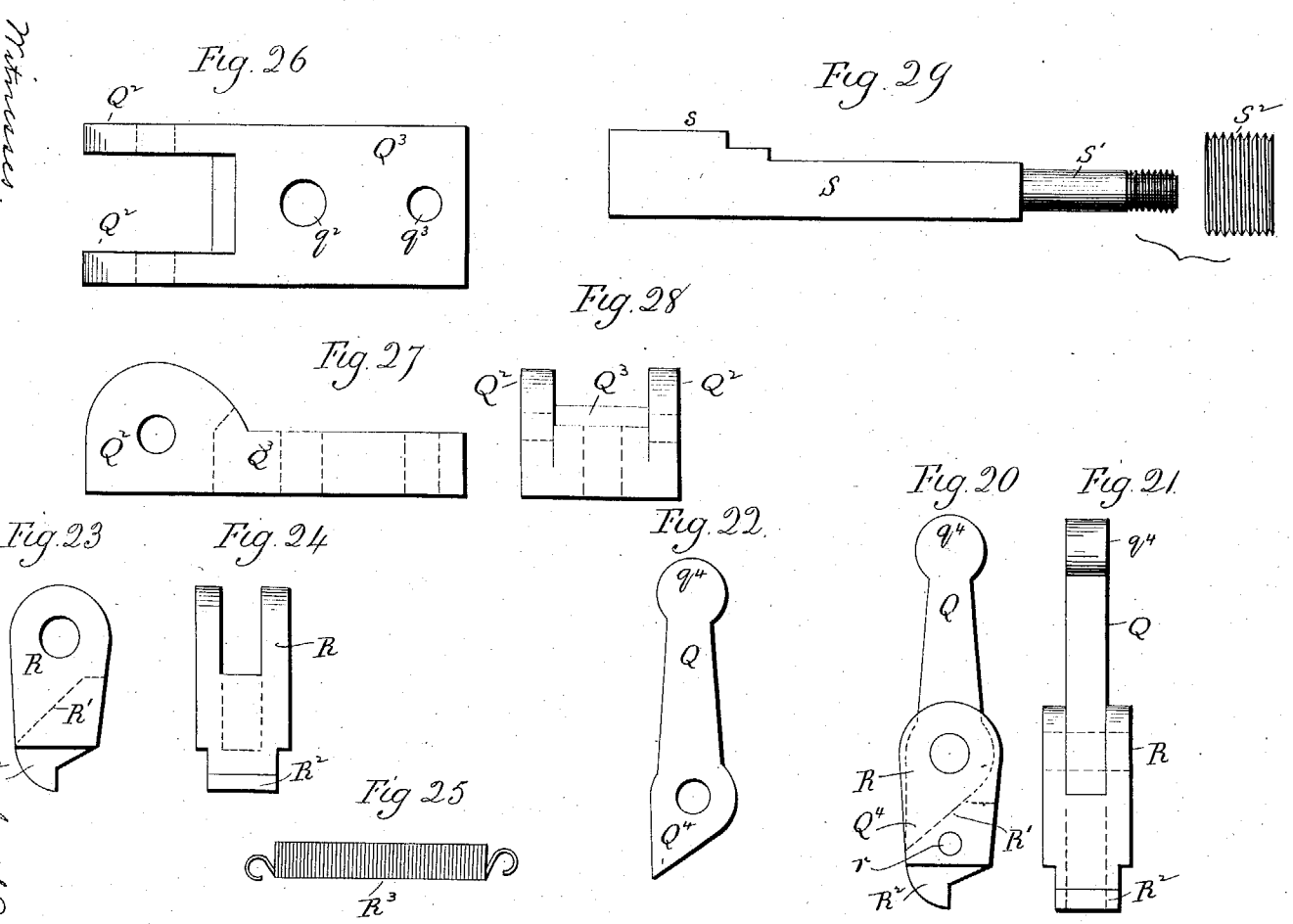
Witnesses.
J. H. Shumway.
Lillian D. Kelsey
Joseph P. Lavigne.
Inventor.
By Atty. Earl Hughson No. 11,690. Reissued Aug. 30, 1898.

J. P. LAVIGNE.

TURRET LATHE.

(Application filed Aug. 3, 1898.)

7 Sheets—Sheet 7.

Witnesses
J. H. Shumway
Lillian D. Kelsey.

Joseph P. Lavigne
Inventor
By Atty Earle & Seymour

UNITED STATES PATENT OFFICE.

JOSEPH P. LAVIGNE, OF NEW HAVEN, CONNECTICUT.

TURRET-LATHE.

SPECIFICATION forming part of Reissued Letters Patent No. 11,690, dated August 30, 1898.

Original No. 607,693, dated July 19, 1898. Application for reissue filed August 3, 1898. Serial No. 687,658.

*To all whom it may concern:*

Be it known that I, JOSEPH P. LAVIGNE, of New Haven, in the county of New Haven and State of Connecticut, have invented a new Improvement in Turret-Lathes; and I do hereby declare the following, when taken in connection with the accompanying drawings and the letters of reference marked thereon, to be a full, clear, and exact description of the same, and which said drawings constitute part of this specification, and represent, in—

Figure 1:
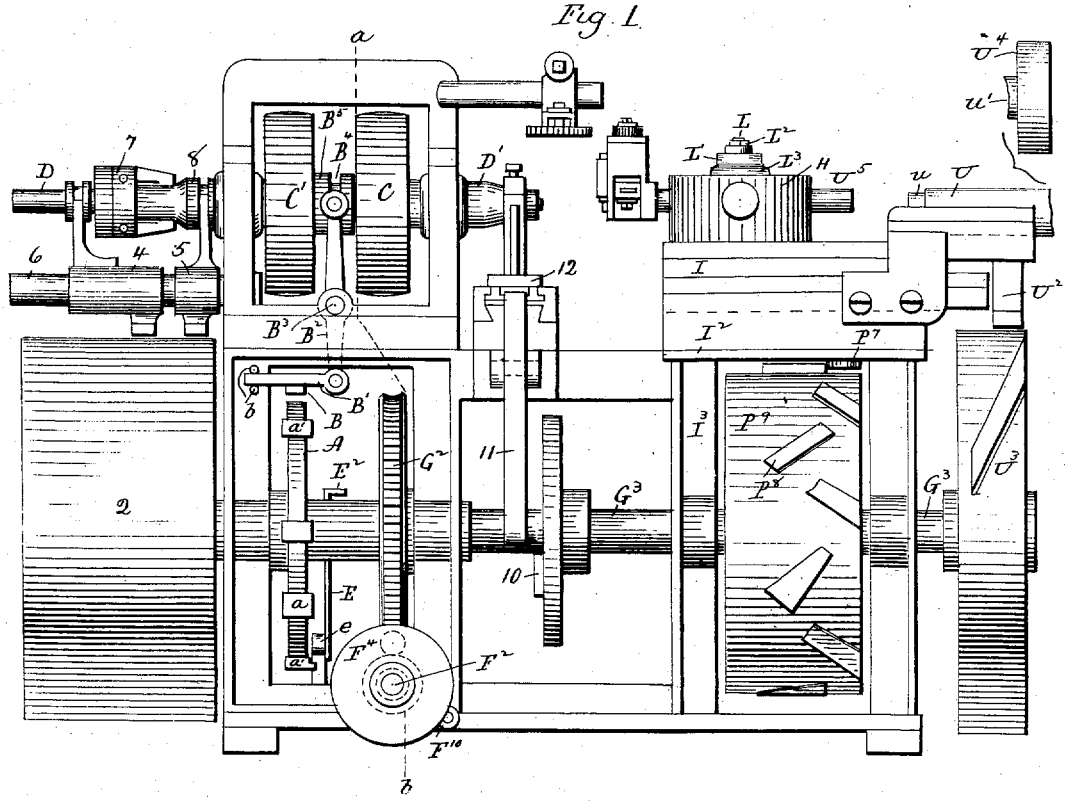
Figure 2:
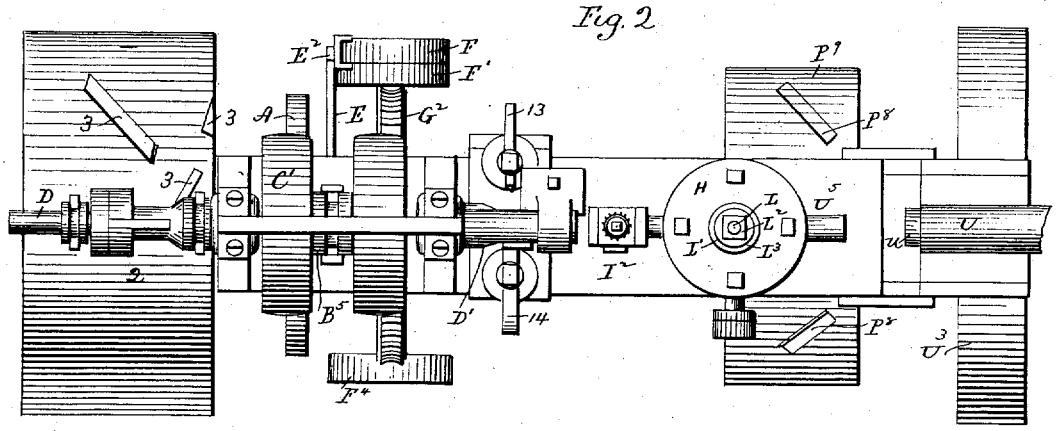
Figure 3:
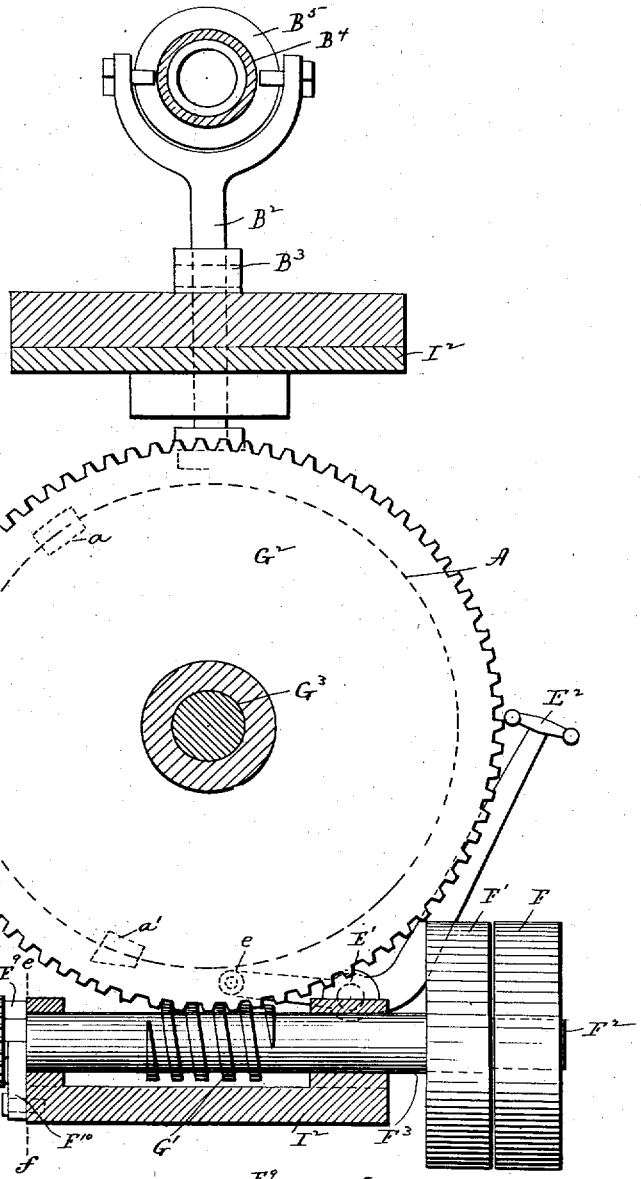
Figure 4:
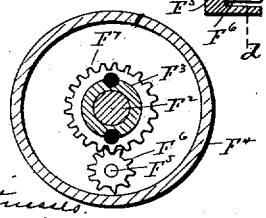
Figure 5:
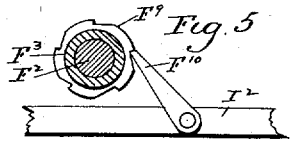
Figure 6:
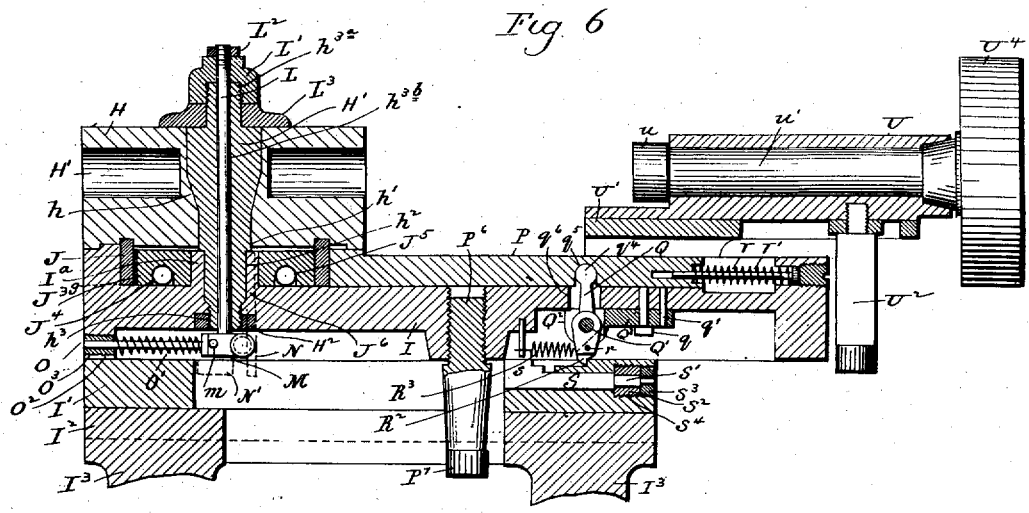
Figure 7:
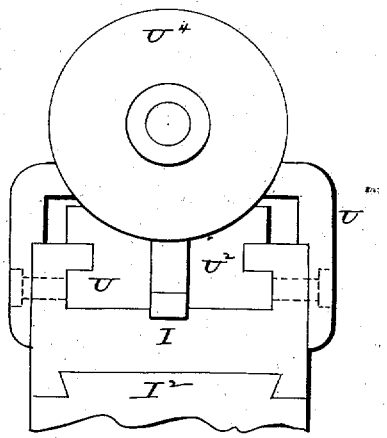
Figure 8:
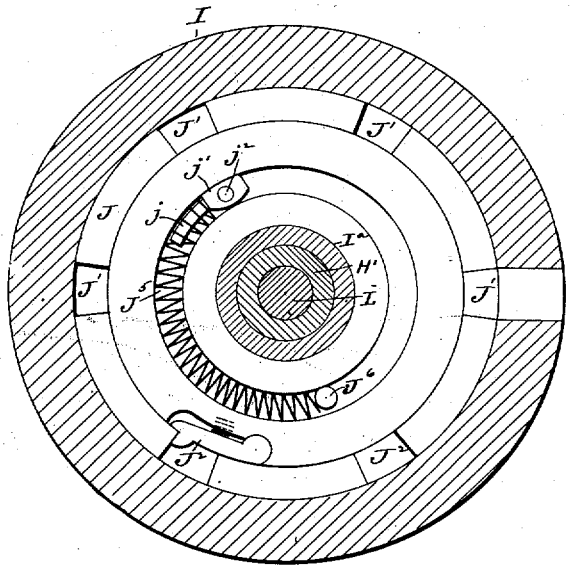
Figure 30:
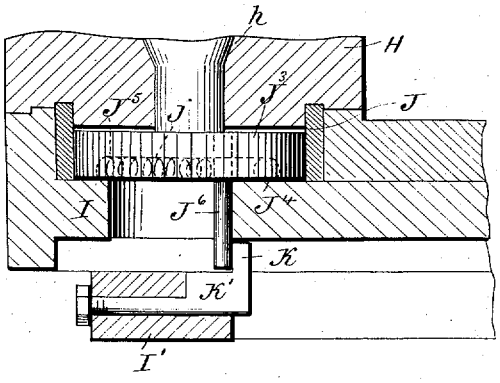

Figure 1, a view in side elevation of one form which a lathe constructed in accordance with my invention may assume; Fig. 2, a plan view thereof; Fig. 3, an enlarged view, in vertical section, on the line *a b* of Fig. 1; Fig. 4, a view in vertical section on the line *c d* of Fig. 3 and looking to the left; Fig. 5, a similar view on the line *e f* of the same figure and looking in the same direction; Fig. 6, a broken vertical longitudinal central section through the turret and turret adjuncts of the lathe; Fig. 7, a broken view, in end elevation, of the lathe, looking at the auxiliary tool-carriage and the adjuncts thereof; Fig. 8, an enlarged reverse sectional plan view of the turret and the adjuncts thereof; Fig. 9, a detached plan view of the slide-holder with the slide removed, but showing the binding-rod of the turret in section and the operating-head, secured to the lower end of the binding-rod, in plan; Fig. 10, a view in vertical section on the line *h i* of Fig. 9 and showing the turret-operating dog of the slide-holder; Fig. 11, a detached plan view of the operating-head secured to the lower end of the binding-rod; Fig. 12, an edge view thereof; Fig. 13, an end view thereof; Fig. 14, a detached view, in side elevation, of the spring guide-rod; Fig. 15, a similar view of the spring; Fig. 16, a detached plan view of the yielding dog; Fig. 17, a detached plan view of the slide with the locking-bar removed; Fig. 18, a detached reverse plan view of the operating-disk carrying the pawl which coacts with the operating-ring depending from the turret; Fig. 9, a view in end elevation of the slide; Fig. 20, a view in side elevation of the knuckle-lever and chambered pawl employed to operate the locking-bar; Fig. 21, an end view of the same parts; Fig. 22, a detached view of the lever in side elevation; Fig. 23, a detached view, in side elevation, of the chambered pawl; Fig. 24, an edge view thereof; Fig. 25, a detached side elevation of the chambered-pawl spring; Fig. 26, a detached plan view of the bracket in which the knuckle-lever and chambered pawl are suspended; Fig. 27, a view of the same in side elevation; Fig. 28, an end view thereof; Fig. 29, a detached view, in side elevation, of the operating-block, together with its adjusting-nut; Fig. 30, a broken view, partly in elevation and partly in vertical section, of the turret mechanism and particularly designed to show the means employed for the rotation of the turret.

My invention relates to an improvement in turret turning-lathes of what I may call the "screw-machine" type, the object being to produce a machine adapted to have a very wide range of work and adjustment considering its number of parts.

With these ends in view my invention consists in a machine having certain details of construction and combinations of parts, as will be hereinafter described, and pointed out in the claims.

The first feature of my invention that I will describe is the means employed for reversing the rotation of the work-holding chuck and for varying the speed with which the cutting-tools are advanced toward and retired from the same. In carrying out this part of my invention I employ a single cam-disk A, whereas prior machines have generally employed two cam-disks, one for reversing the work-holding chuck and one for providing for varying the speed with which the cutting-tools are advanced toward and retired from the said chuck. The said cam-disk A is provided with two separate sets of cams, of which the cams *a* are the reversing-cams and *a'* the speed-cams. The said cams *a* coact with an antifriction-roller B, mounted upon the under face of a slide B', guided between studs *b b*, and pivotally connected at one end with the lower end of a clutch-lever $B^2$, hung upon a horizontal stud $B^3$, and having its forked upper end connected in the usual manner with the collar $B^4$ of the clutch $B^5$, which is located between the right-hand pulley C and the left-hand pulley C', the said pulleys running in opposite directions, and being coupled with the shaft D, carrying the work-holding chuck D′, by means of the clutch $B^5$, according as it is desired to have the work rotate in one direction or the other. It will readily be understood that by varying the number of the reversing-cams *a* upon the cam-disk A and by suitably applying the said cams to the said disk the work-holding tool may be reversed as often as desired and at any desired intervals.

The speed-cams *a′* applied to the cam-disk A coact with a stud *e*, located upon the lower end of the belt-shifting lever E, which is hung upon a horizontal stud E′ and formed at its upper end with a fork $E^2$, receiving the belt, which is shifted by the action of the lever from the fast driving-pulley F to the slow driving-pulley F′, and vice versa. The said pulley F is rigidly secured to an inclosed shaft $F^2$, which passes through a hollow shaft $F^3$, to which the pulley F′ is rigidly secured, the said shafts $F^2$ and $F^3$ being located directly below the cam-disk A. To the opposite end of the shaft $F^2$ is secured a cup $F^4$, provided with a stud $F^5$, upon which is mounted a pinion $F^6$, which is therefore located eccentrically with respect to the center of the cup and the shaft $F^2$. The said pinion $F^6$ meshes into two gear-wheels $F^7$ and $F^8$ simultaneously, the said wheels corresponding in size, but differentiated in the number of their teeth, the gear-wheel $F^7$ having one tooth less than the gear-wheel $F^8$. The gear-wheel $F^7$ is located within the cup $F^4$ and fixed upon the adjacent end of the tubular shaft $F^3$, while the gear-wheel $F^8$ is mainly located within the cup $F^4$, but not entirely so, and loosely mounted upon the said end of the tubular shaft $F^3$. The said gear $F^8$ is provided with a ratchet-wheel $F^9$, the teeth of which are engaged by a pawl $F^{10}$, extending upwardly and pivoted at its lower end to the oil-box G, through which the solid and tubular shafts $F^2$ and $F^3$ pass and which contains the worm G′, which is mounted upon the tubular shaft $F^3$ and which meshes into the teeth of the worm-gear $G^2$, which in turn is rigidly secured to the shaft $G^3$, carrying the cam-disk A, already described. It will be understood that the driving mechanism just described forms what is technically known in mechanics as a "planet-motion." When the belt is running upon the fast pulley F, the power will be communicated to the worm-gear $G^2$ through the cup $F^4$, pinion $F^6$, gear-wheels $F^7$ and $F^8$, and the tubular shaft $F^3$ and be so reduced in speed that the gear-wheel will move but very slowly for the reason that one complete revolution of the shaft $F^2$ and cup $F^4$ will only rotate the tubular shaft $F^3$ through a distance represented by one tooth of the gear-wheel $F^8$, which has one more tooth than the gear-wheel $F^7$. In this connection it may be explained that as the cup $F^4$ revolves and carries the pinion $F^5$ with it the same will gain what is represented by one tooth on the wheel $F^7$ during each revolution of the cup, because the pinion also meshes into the teeth of the wheel $F^8$, which contains one more tooth than the wheel $F^7$. Therefore the pinion $F^6$ operates upon the wheel $F^8$ as a point of purchase to push the wheel $F^7$ and turn the shaft $F^3$, the wheel $F^8$ being prevented from turning backward by means of the pawl $F^{10}$. It will thus be seen that when the belt is running upon the fast pulley F the gear-wheel $G^2$ will be driven very slowly. On the other hand, when the belt is running on the pulley F′, which is mounted directly upon the tubular shaft $F^3$, the gear-wheel will be run much more rapidly. When the tubular shaft $F^3$ is running as last described, the parts of the planet-motion will be slowly driven idly. The speed with which the gear-wheel $G^2$ runs determines the speed of the shaft $G^3$, which carries the cam-drum $P^9$, the speed of which determines the speed with which the cutting instrumentalities are advanced toward and retired from the work-holding chuck D′.

I wish to call particular attention to the fact that the planet-motion mechanism and the driven pulleys F and F′ are located at opposite ends of the two shafts and below the gear-wheel $G^2$ and very near the bottom of the machine. This is a convenient location for this mechanism and permits the worm-gear G to be constantly submerged in oil, which is desirable in a machine of this class, but which cannot so conveniently be done if the worm-gear is located near the top of the machine.

The next feature of my improvement to be described is the mechanism for operating and frictionally binding the turret H, in which a portion of the cutting-tools are mounted. The said turret is itself mounted for step-by-step rotation upon and reciprocating motion with a slide I, which in turn is mounted for reciprocation in a slide-holder I′, adjustably mounted upon the bed $I^2$ of the frame $I^3$ of the lathe. The turret H rotates upon a heavy vertically-arranged turret-stud H′, having a beveled surface *h*, a shoulder *h′*, a reduced lower end $h^2$, and a threaded neck $h^3$, the latter receiving a nut $H^2$, located in a recess *i*, formed for it in the under face of the slide, in which the said stud H′ is thus secured, the nut $H^2$ drawing the shoulder *h′* of the stud down upon the hub $I^a$ of the slide.

I may here remark that the beveled turret-stud H′ is formed of steel, whereby the wear due to the intermittent rotation of the turret and the heavy thrusts thereupon is reduced to the minimum. Moreover, what wear does occur may be taken up by removing the stud and turning down the shoulder *h′* thereof, after which the stud is replaced in the slide, in which it is held by the nut *i*. The said turret-stud is also formed with a central longitudinal passage $h^3$ for the reception of the binding-rod L, to be described later on.

For the positive step-by-step rotation of the turret I provide it with a depending operating-ring J, having in its lower edge a series of notches J′, which will vary in number and location according to the desired operation of the turret. The said notches receive a spring-actuated pawl $J^2$, carried by an operating-disk $J^3$, which is mounted in the upper face of the slide I, so as to rotate upon the hub $I^a$ thereof. The said disk $J^3$ is therefore located directly under the turret. The lower face of the disk is formed with a segmental channel $J^4$, receiving a coiled spring $J^5$, the inner end of which passes over a curved finger $j$, secured to a block $j'$, fastened by means of a pin $j^2$ to the slide I. The opposite end of the spring bears against an operating pin or stud $J^6$, depending from the disk in position to engage with the tooth K of a turret-operating dog K′, mounted in the forward end of the slide-holder I′. When the slide moves forward to advance the turret to the work, the pin $J^6$ leaves the tooth K of the dog K′ and allows the spring $J^5$ to expand and reversely rotate the disk $J^3$ for a sufficient distance to permit the reëngagement of the pawl $J^2$ thereof with the next succeeding notch J′ in the operating-ring J, rigidly secured to and depending from the under face of the turret. In the backward movement of the slide, however, the pin $J^6$ engages with the tooth K of the dog K′ and positively rotates the disk, which, through the medium of its pawl $J^2$, positively rotates the turret through the operating-ring J. At the same time the backward movement of the slide compresses the spring $J^5$, one end of which is secured to it, as before described, whereby the spring is compressed preparatory to its work of rotating the disk for the purpose of engaging the pawl thereof with a new notch in the ring $J^2$ during the next forward movement of the slide and turret.

It is necessary that at the time the turret is doing its work it should be held solidly, for upon the solidity with which it is held while it is performing its work depends the accuracy thereof. It is also necessary that the turret shall be loose part of the time, so that it may be positively rotated step by step. For frictionally binding the turret I employ a rod L, which passes down through the large turret-stud H′. The upper end of this rod is threaded for the application to it of a cup-shaped binding-nut L′ and a check-nut $L^2$, which secures the binding-nut upon the binding-rod when it has once been set in the desired position thereupon. Here I may point out that the threads formed upon the upper end of the binding-rod L are much finer in pitch than the threads formed upon the neck or stem $h^{3a}$, formed at the upper end of the turret-stud, this differentiation in threads being necessary to provide for adjusting the binding-nut upon the upper end of the binding-rod, so as to secure more or less binding action without reference to the instrumentalities connected with the lower end of the rod. The binding-nut L′ bears at its lower edge upon a large flat binding-washer $L^3$, resting upon the upper face of the turret H. The interior of the binding-nut is screw-threaded for the reception of the screw-threaded stem $h^{3a}$, formed at the upper end of the turret-stud H′. In view of this construction when the binding-rod L is turned in one direction the binding-nut L′ is turned with it and slightly lifted above the binding-washer $L^3$, which then ceases to bind down upon the turret H, permitting the same to be rotated practically without resistance. On the other hand, when the binding-rod L is turned in the opposite direction the nut L′ is turned with it and forced down upon the washer $L^3$, which is thrust down upon the turret, so as to hold the same solid against rotation to any degree in either direction. The rotation of the binding-rod in one direction or the other, as described, is effected by means of mechanism located at its lower end and upon the under face of the slide I. The lower end of the said rod projects below the lower end of the turret-stud H′ and has an operating-head M rigidly secured to it by means of a set-nut $m$, the said head entering a large opening $I^b$ formed for its reception in the slide I. The said head is chambered for the reception of a dog M′ and a spring $M^2$, which exerts a constant effort to throw the dog outward. A pin $m'$, mounted in the dog M′, limits the play of the dog by entering a slot $m^2$, formed in the head M, as clearly shown by Fig. 9. The projecting outer end of the dog is formed with a beveled face $m^3$ and coacts with a pin N and a flat plate-like stud N′, which project upward from the upper face of the slide-holder I′. The said head has pivotally connected with it a spring guide-rod O, which is encircled by a spring O′, located in a chamber $O^2$, formed in the slide-holder, the outer end of the said chamber being enlarged for the reception of a nut $O^3$, by means of which the tension of the spring $O^2$ is regulated. The extreme outer end of the guide-rod O plays back and forth through the nut.

The mechanism above described operates as follows: When the slide is moving forward and carrying the turret to its work, the same is held solidly against any rotation whatever by the binding action of the binding-rod L, which is held in position for forcing the binding-nut L′ down upon the binding-washer $L^3$ by the action of the spring O′ against the head M, rigidly connected with the lower end of the rod. As the slide moves forward the beveled edge $m^3$ of the dog M′ snaps over the stud N′ without affecting the position of the head M or turning the binding-rod. When, however, the slide begins its rearward movement, during which it loosens the turret for the rotation of the same, the straight edge of the dog M′ engages with the stud N′, after which the continued rearward movement of the slide effects the swinging of the head M, and hence the rotation of the binding-rod against the tension of the spring $O^2$, which is compressed, the binding-rod being at this time turned, so that the binding-nut L′ is lifted and the binding action of the binding-washer for the time suspended or relieved. When in the backward movement of the slide the dog M′ snaps off from the stud N′, it engages with the pin N, which limits the loosening rotation of the binding-rod and at the same time permits the binding-rod to begin its tightening rotation very near the beginning of the forward movement of the slide with the turret. It will thus be seen that by means of the mechanism described soon after the slide begins its forward movement with the turret the binding-rod acts to solidly bind the turret upon the slide and so hold it until after the turret has performed its work and that almost immediately after the beginning of the rearward movement of the slide with the turret the binding-rod is operated so as to loosen the turret and permit it to be rotated to bring another tool into play.

The next feature of my invention to be described is the means employed for positively locking the turret against rotation in either direction at the time it is doing its work. For this purpose I employ a locking-bar P, which is located in a long groove P′ formed for its reception in the upper face of the slide I. The extreme forward end of the bar is beveled to adapt it to readily enter the beveled locking-notches J′, formed in the operating-ring J, secured to and depending from the turret H, the rotation of which, as provided for, successively brings the notches J′ in the ring into alinement with the beveled forward end of the bar, which is forced forward independently of the movement of the slide, so as to enter the notches and positively lock the turret against rotation in either direction, the locking of the turret being also effected by means of the friction device already described. In order to provide for taking up the wear of the forward end of the bar and the side walls of the slot P′, the forward end of the slide is formed with two longitudinal cuts $P^3$ $P^3$, whereby two slightly-flexible arms $P^4$ $P^4$ are produced, these arms containing the forward ends of the side walls of the groove P′. For setting these arms inward to take up the wear of the bar or walls I employ two take-up screws $P^5$ $P^5$, transversely arranged with respect to the slide and located opposite each other in line and impinging against the outer faces of the said yielding arms at points near the forward ends thereof. When these screws are turned inward, the arms are sprung sufficient to take up any wear which may occur between the bars and side walls of the slot. These screws may also be employed to realine up the machine, as it were, for if more wear takes place on one side than on the other the screws may be respectively adjusted so as to virtually shift the position of the forward end of the bar enough to restore the machine to alinement. The slide itself is operated back and forth by means of a heavy depending pin $P^6$, provided with an antifriction-roller $P^7$, which coacts with suitably-arranged cams $P^8$, adjustably mounted upon the cam-drum $P^9$, which is keyed to the shaft $G^3$, before mentioned as being the shaft upon which the worm-gear $G^2$ is mounted.

The next feature of my invention to be described is the mechanism employed for reciprocating the locking-bar P. This mechanism comprises a knuckle-lever Q, hung upon a horizontal pin Q′, the ends of which are supported in the arms $Q^2$ $Q^2$ of a bracket $Q^3$, which is firmly secured to the lower face of the slide I by means of a screw $q$ and a dowel-pin $q'$, passing through holes $q^2$ $q^3$, formed in the bracket. The upper end of the said lever has a knuckle-like enlargement $q^4$ and enters a socket $q^5$ formed to receive it in the lower face of the bar, the said upper end of the lever passing through a vertically-arranged clearance-opening $q^6$, formed in the slide, as clearly shown in Fig. 6. The said lever is operated by means of a chambered pawl R, suspended from the horizontal pin Q′, before mentioned, and located between the two arms $Q^2$ $Q^2$ of the bracket $Q^3$. The said lever Q is itself inserted into the upper end of the chambered pawl and extends downward thereinto below the pin Q′, its lower end being formed with a beveled face $Q^4$, which coacts with an oppositely-beveled surface R′, formed within the lower end of the pawl, the extreme lower end of which is constructed with a rearwardly-facing tooth $R^2$. A pin $r$, carried by the pawl R, is provided for the attachment of the rear end of a pawl-spring $R^3$, the forward end of which is attached to a pin $r'$, depending from the slide. The function of this spring is to exert a constant effort to pull the chambered pawl R forward and keep its beveled face R′ in contact with the beveled face $Q^4$ of the pawl. The tooth $R^2$ of the pawl coacts with the forward end of an adjustable horizontally-arranged operating-block S, which is mounted in the slide-holder I at a point directly under the lever Q and chambered pawl R, the said block being formed with a threaded stem S′, receiving an adjusting-nut $S^2$ and a check-nut $S^3$, the said nuts $S^2$ $S^3$ being located in a horizontally-arranged threaded recess $S^4$ formed to receive them in the rear end of the slide-holder. When the slide moves forward, the rounded forward edge of the tooth $R^2$ of the pawl R engages with the step $s$ of the operating-block and trails and snaps over the same, the pawl at the same time swinging on the pin Q′ and the spring $R^3$ being stretched. When the tooth of the said pawl snaps over the step $s$ of the block S, the tooth is in position to be engaged with the forward edge of the said step. When now the slide makes its rearward movement, the tooth does engage with the forward edge of the step, whereby the pawl is positively turned on its pivot, its beveled face R′ then coacting with the beveled face $Q^4$ of the lever Q, so as to swing the upper end of the lever rearward, and thus move the bar rearward and its forward end out of that one of the notches J′ of the ring J in which it has been inserted. This rearward movement of the bar is effected against the tension of a spring T, which is employed for pushing the bar forward, the said spring being supported upon a guide-rod T′, the forward end of which is entered into the rear end of the bar and the rear end of which is formed with a head $T^2$, which is engaged by an adjustable headless tension-screw $T^3$, which is located in a threaded socket formed for its reception in the extreme rear end of the slide. It will be seen that the lever Q and chambered pawl R are employed for retracting the slide against the tension of the spring T, which is utilized for pushing the slide forward, at which time it swings the lever Q forward and the pawl R rearward against the tension of the pawl-spring $R^3$.

I may, if I choose, employ an auxiliary tool-carriage U, mounted in a bracket U′, bolted to the extreme rear end of the slide-holder. The said tool-carriage is operated back and forth by means of a depending pin $U^2$, coacting with an auxiliary cam $U^3$, mounted upon the extreme rear end of the shaft $G^3$. The tool-carriage is provided with a suitable tool-chuck *u*, mounted upon a shaft *u′*, which is actuated by means of a pulley $U^4$. (Shown in Figs. 1, 5, and 6.) It is designed that the device last described shall be arranged and timed so that it will perform some cutting operations upon the opposite end of the work from the end which was cut and formed by the other cutting instrumentalities of the machine. Thus just as the work is being cut off in the ordinary manner it might be taken by a work-holder $U^5$, carried by the turret, and then presented to the action of a tool carried by the chuck *u*.

Although forming no part of my present invention, I may with propriety refer to the large cam-wheel 2, furnished upon its outer periphery with cams 3, which coact with the sliding clutch-block 4 and the sliding collar-block 5, which are mounted upon a horizontal stud-like shaft 6 and which respectively coact with a sliding clutch 7 and a sliding clutch-collar 8, both of which are mounted upon the shaft D, upon the inner end of which the work-holding chuck D′ is located. I also locate upon the shaft $G^3$ a cam-disk 9, provided with a cam 10, coacting with the lower end of a pivotally-hung vertically-arranged operating-lever 11, the upper end of which is connected with and operates the transversely-sliding block 12, which carries the cutting-off tool 13 and the shaping-tool 14, as shown in Fig. 2.

It is apparent that in carrying out my invention some changes from the combination, arrangement, and construction of parts herein shown and described may be made. It is also apparent that the several devices described may or may not be used in the combinations herein shown, as I may use any one of them or any combination of them in different machines. I would therefore have it understood that I do not limit myself to the arrangement herein shown and described, but hold myself at liberty to make such variations therefrom as fairly fall within the spirit and scope of my invention.

Having fully described my invention, what I claim as new, and desire to secure by Letters Patent, is—

1. In a lathe, the combination with a work-holding chuck of a clutch mechanism by means of which the work-holding chuck is reversed in the direction of its rotation, cutting-tools, a speed-regulating mechanism for varying the speed with which the cutting-tools are advanced toward and retired from the said work-holding chuck, and a single disk provided with reversing-cams and speed-cams respectively arranged to coact with the reversing mechanism and the speed-regulating mechanism for operating the same.

2. In a lathe, the combination with a work-holding chuck, of a clutch mechanism by means of which the work-holding chuck is reversed in the direction of its rotation, the said clutch mechanism including a clutch-lever; cutting-tools, a speed-regulating mechanism for varying the speed with which the cutting-tools are advanced toward and retired from the said work-holding chuck, including a belt-shifting lever; a cam-disk, and reversing-cams and speed-cams mounted in the said disk and respectively coacting with the said clutch-lever and the said belt-shifting lever for the operation of the said clutch mechanism and the said speed-regulating mechanism.

3. In the speed-regulating mechanism of a lathe, the combination with a worm-gear, of a worm located below the same, a hollow shaft upon which the worm is located, a shaft passing through the said hollow shaft, slow and fast pulleys mounted upon the adjacent ends of the hollow and inclosed shafts respectively, and the elements of a planet-motion mechanism connected with the opposite ends of the shafts, whereby the worm-gear is driven fast or slow according as the power-belt runs upon the slow or fast pulley.

4. In a lathe, the combination with a worm-gear, of a worm located below and meshing into the same, a tubular shaft carrying the said worm, a shaft passing through the tubular shaft, a slow pulley keyed to one end of the tubular shaft, a fast pulley keyed to the projecting adjacent end of the inclosed shaft, a cup keyed to the projecting opposite end of the inclosed shaft, a pinion located within the said cup and mounted upon a stud located near the edge thereof, two gear-wheels located substantially within the said cup, corresponding to each other in size, differentiated in the number of their teeth, and both meshed into by the said pinion, the wheel having the fewest teeth being keyed to the adjacent end of the tubular shaft, and the wheel having the larger number of teeth being loosely mounted upon the said end of the said shaft, a ratchet connected with the gear-wheel last mentioned, and a pawl coacting with said ratchet whereby when the power-belt runs upon the slow pulley the gear-wheel into which the worm meshes will be driven at a comparatively high speed, while when the power-belt is shifted to the fast pulley the speed of the said gear-wheel will be reduced by the operation of the cup, the pinion, the differentiated gear-wheels, the ratchet-wheel and the pawl.

5. In a lathe, the combination with a slide-holder, of a slide mounted therein, a turret mounted upon the slide, an operating-ring rigidly secured to and depending from the turret, an operating-disk carried by the slide but located within the said ring, a pawl carried by the said disk, and coacting with notches formed in the said ring, an operating-spring located within the disk and oscillating the same for successively engaging the pawl with the notches in the ring, an operating-pin depending from the disk, and a dog mounted in the slide and coacting with the ring for positively rotating the turret in the backward movement of the slide, and at the same time compressing the spring which acts in the forward movement of the slide to oscillate the disk, substantially as described.

6. In a lathe, the combination with a slide-holder, of a slide mounted therein, a turret mounted upon the slide, a turret-stud passing downward through the turret into the slide with which it is connected, a binding-rod passing downward through the said stud, a binding-nut applied to the upper end of the binding-rod and exerting a downward pressure upon the turret for clamping the same against rotation, an operating-head secured to the lower end of the rod, a spring coacting with the said head for turning the rod in one direction, and a yielding dog mounted in the said head, and operating to turn the rod in the opposite direction during the rearward movement of the slide.

7. In a lathe, the combination with a slide-holder, of a slide mounted therein, a turret mounted on the slide, a turret-stud passing downward through the turret and connected with the slide, a binding-rod passing downward through the turret-stud, a binding-nut applied to the upper end of the binding-rod, and adapted to exert downward pressure upon the turret, an operating-head secured to the lower end of the said rod, a spring coacting with the said head so as to turn the rod in one direction and bring the binding-nut at its upper end into operation, a yielding dog also mounted in the said head, and forced out of action during the forward movement of the slide, and a stud mounted in the slide and coacting with the said yielding dog which operates to turn the binding-rod in the opposite direction during the backward movement of the slide for taking off the clamping action of the binding-nut at the upper end of the rod.

8. In a lathe, the combination with the slide-holder, the slide and the turret thereof, of a reciprocating bar for positively locking the turret, means for actuating the said bar, and means for taking up the wear of the bar and restoring the alinement of the machine by shifting the forward end of the bar.

9. In a lathe, the combination with a slide-holder, of a slide mounted therein and formed with a long groove and with two integral yielding arms forming the forward portions of the side walls of the said groove, a locking-bar located in the said groove and coacting with the turret to positively lock the same against rotation in either direction, means for reciprocating the slide, and adjusting-screws coacting with the said integral yielding arms for taking up wear and for restoring the alinement of the machine by shifting the forward end of the bar.

10. In a turret-lathe, the combination with a slide-holder, of a slide, a turret mounted upon the slide, a bracket secured to the rear end of the slide, a tool-carriage mounted in the said bracket, a tool-holder carried by the said carriage, and means for operating the said tool-holder, whereby work presented to the said cutter by the turret is cut on the opposite end from the end cut by the tools carried by the turret.

11. In a lathe, the combination with the bed thereof, of a worm-gear located below the same, a worm situated below the said worm-gear, a hollow shaft upon which the worm is located, a shaft passing through the said hollow shaft, slow and fast pulleys mounted upon the adjacent ends of the hollow and inclosed shafts respectively, planet-motion mechanism connected with the opposite ends of the shafts, whereby the worm-gear is driven fast or slow according as the power-belt runs upon the slow or fast pulley, and an oil-box located below the worm-gear and between the fast and slow pulleys and the planet-motion mechanism, and containing the said hollow shaft and therefore the worm, which is more or less submerged in the oil within the box.

12. In a turret-lathe, the combination with the turret thereof, of a turret-slide, a turret-stud secured by its lower end to the slide, having the turret mounted for rotation upon it and projecting upward through the same, formed with a central longitudinal passage, and adapted to take up wear between it and the turret, a binding-rod passing through the said passage of the turret-stud and projecting above and below the upper and lower ends thereof, means applied to the projecting upper end of the stud and the projecting upper end of the rod for imposing downward pressure upon the upper face of the turret, and automatically-operated means connected with the projecting lower end of the binding-rod for automatically binding the turret in its operating positions.

13. In a turret-lathe, the combination with the turret thereof, of a turret-slide, a turret-stud passing through the turret which rotates upon it, secured to the slide, having a central longitudinal passage formed in it, and provided at its upper end with a threaded neck, a binding-rod extending downward through the central passage of the turret-stud, and having its upper end threaded, a binding-nut screwed upon the said neck of the stud, and also screwed upon the upper end of the binding-rod which is threaded for the purpose, the threads of the neck and the rod being differentiated, and means connected with the lower end of the rod for automatically operating the rod to bind the turret through the binding-nut in its operating positions.

In testimony whereof I have signed this specification in presence of two subscribing witnesses.

JOSEPH P. LAVIGNE.

Witnesses:

FRED. C. EARLE,

LILLIAN D. KELSEY.